United States Patent
Musial

(10) Patent No.: US 7,267,747 B2
(45) Date of Patent: Sep. 11, 2007

(54) PLANT AND METHOD FOR VACUUM DISTILLATION OF HYDROCARBON LIQUIDS

(75) Inventor: Thomas Hugh Musial, Mobile, AL (US)

(73) Assignee: Chevron U.S.A. Inc., San Ramon, CA (US)

( * ) Notice: Subject to any disclaimer, the term of this patent is extended or adjusted under 35 U.S.C. 154(b) by 297 days.

(21) Appl. No.: 10/401,617

(22) Filed: Mar. 26, 2003

(65) Prior Publication Data
US 2004/0188237 A1    Sep. 30, 2004

(51) Int. Cl.
*B10D 3/10* (2006.01)
*C10G 7/06* (2006.01)

(52) U.S. Cl. .......... 202/182; 202/186; 202/205; 196/98; 196/114; 203/87; 203/91; 203/DIG. 14; 208/357; 208/366

(58) Field of Classification Search ............ 202/182, 202/186, 205; 208/357, 366; 203/87, 91, 203/DIG. 14; 196/98, 114, 138
See application file for complete search history.

(56) References Cited

U.S. PATENT DOCUMENTS

| | | | | |
|---|---|---|---|---|
| 4,011,202 A | * | 3/1977 | Ebner et al. | 528/483 |
| 6,280,578 B1 | * | 8/2001 | Popov | 203/91 |
| 6,878,239 B1 | * | 4/2005 | Matsumoto et al. | 203/8 |
| 2003/0005823 A1 | * | 1/2003 | Le Blanc et al | 95/149 |

* cited by examiner

*Primary Examiner*—Virginia Manoharan
(74) *Attorney, Agent, or Firm*—Steven R. Ellinwood

(57) ABSTRACT

A vacuum distillation system and method utilizing a low capacity vacuum producing ejector operated in parallel with a primary ejector during the Winter months enables significant reduction in the absolute pressure of a vacuum distillation column. Operation of a vacuum distillation tower at lower absolute pressures results in increased yield of desirable vacuum distillation products.

1 Claim, 5 Drawing Sheets

One Embodiment of the Invention

Vacuum Distillation System with Precondenser (Prior Art)

"Deep Cut" Vacuum Distillation System with Inter-condenser (Prior Art)

Seasonal First Inter-Condenser Pressure

Primary Ejector Characteristic Performance Curve

One Embodiment of the Invention

PLANT AND METHOD FOR VACUUM DISTILLATION OF HYDROCARBON LIQUIDS

FIELD OF THE INVENTION

The present invention relates to the field of hydrocarbon refining by the method of vacuum distillation.

BACKGROUND OF THE INVENTION

Vacuum distillation of petroleum hydrocarbons is a well known refining process commonly utilized in the art to minimize thermal cracking of heavier fractions of crude oil and obtain lighter desired products. Distilling these heavier materials under vacuum, that is lower pressure, decreases the boiling temperature of the various hydrocarbon fractions in the feed and therefore minimizes thermal cracking of these fractions. In conventional vacuum distillation systems, distillation is carried out in a vacuum column under pressures typically in the range of 25 to 100 millimeters of mercury (mmHg). It is important in such systems to reduce pressure as much as possible to improve vaporization. Vaporization is enhanced by various methods such as the addition of steam at the furnace inlet and at the bottom of the vacuum distillation column. Vacuum is created and maintained using cooling water condensers and steam driven ejectors. The size and number of ejectors and condensers used is determined by the vacuum needed and the quantity and quality of vapors handled. Three ejector stages are usually required for a distillation column flash zone pressure of 25 mmHg. In a conventional system of this type, the first stage condenses the steam and compresses non-compressible gases, while the second and third stages remove the non-condensable gases from the condensers. The vacuum produced is limited to the vapor pressure of the water used in the condensers. If colder water is supplied to condensers, a lower absolute pressure can be obtained in the vacuum tower.

In contemporary conventional vacuum distillation systems, the most common design includes a condenser upstream of the ejectors, known as a pre-condenser, to reduce the size and steam consumption of the vacuum system. FIG. 1 illustrates a pre-condenser type vacuum system. In this type of system, the lowest achievable pressure is the partial pressure of the process vapor in the pre-condenser, which is determined by the temperature of the condensing fluid, usually water. In a pre-condenser type system, the process vapor from the pre-condenser is usually 80 to 90 percent water so the lowest pressure achievable is about 15 percent greater than the vapor pressure of water at the equilibrium vapor outlet temperature, which as noted is equal to the temperature of the condensing liquid, usually water. In warm, humid climates, such as the US Gulf Coast where the average wet bulb temperature in the summertime is 80° F., the lowest achievable pressure in a pre-condenser type vacuum system is about 50 mmHg when condenser-cooling water is available only at ambient temperatures. Adding more ejectors or increasing the capacity of the existing ejectors in the system does not result in lower distillation column pressure because of the high percentage of water in the process vapor.

To further minimize thermal cracking, it is desirable to achieve pressures in vacuum distillation columns lower than the 40 to 60 mmHg typical of pre-condenser type vacuum systems. This problem is addressed in vacuum distillation system designs known as "deep-cut technology", which involves installation of primary ejectors upstream of any condensers in the process flow scheme. FIG. 2 illustrates a "deep-cut" type vacuum distillation system. In this type of system, the vacuum distillation column overhead vapor is compressed by the primary ejector which allows the column to operate at low absolute pressures in the range of 5 to 20 mmHg. As illustrated in FIG. 2, the large primary ejector discharges first into a large condenser, known as a first inter-condenser. The first inter-condenser must condense not only the column stripping and furnace lift steam, but also the motive steam used to power the primary ejector.

In deep-cut type vacuum distillation systems, the primary ejectors are designed for a specific suction load and discharge pressure, also known as backpressure. The process or suction load to the primary ejector is determined by the vacuum column process design requirements (principally process steam injection rate and desired vacuum gas oil make) while the backpressure is determined primarily by the design of the first inter-condenser. In the art, the normal practice is to design the ejectors to operate under worst case conditions; that is, when the cooling water available is the warmest and the heat exchanger in the condensing system is fouled. Thus, when cooling water temperature is colder than such "worse case" design conditions, such as in the cool season months in sub-tropical regions, extra condensing capacity is available and the first inter-condenser. This extra condensing capacity results in a lower than design backpressure in the primary ejector.

In sub-tropical regions of the Northern hemisphere, such as the US Gulf Coast, the average temperature of available cooling water during the year varies between about 60° F. and 85° F. During the cool season months, lower cooling water temperatures result in a pressure in the first inter-condenser can be expected to range between about 35 mmHg and 60 mmHg, whereas during the warm season months, the expected absolute pressures in the first inter-condenser typically are about 20 percent to 40 percent higher. Pressure in the first inter-condenser represents backpressure on the primary ejector, which, as noted, is designed to operate efficiently under the worst-case conditions prevalent during the warm season months. Thus, the primary ejector is not typically designed to take advantage of lower backpressures available as a result of lower temperature cooling waters available during the cooler season months.

FIG. 4 depicts a characteristic performance curve for a primary ejector and illustrates and provides an example of the problem to be solved by the present invention. Thus, as illustrated in FIG. 4, as the process or suction load to the primary ejector increases, so does the suction pressure and therefore the column pressure. In the example shown in FIG. 4, the primary ejector is designed for a process load in the range of 8,500 to 10,500 pounds per hour to achieve a suction pressure in the range of a 13 to a 17 mmHg. This standard performance curve does not show the effect of backpressure from the first inter-condenser on the ejector. Under this circumstance, lowering the backpressure will not have any measurable effect on the ejectors suction pressure. Thus, the extra condensing capacity available from lower temperature cooling water available during the cool season months does not result in a lower column pressure. Available methods to reduce the column pressure, such as decreasing the suction load by decreasing the column stripping steam injection rate or reducing the furnace lift steam injection rate, has the effect of decreasing efficiency of the vacuum column and reduces the recovery of desirable gas oil product. Another method to reduce the vacuum column pressure would be to install larger primary ejectors; however, larger primary ejectors requires installation of facilities for injection of more steam, installation of larger condensers and systems for circulating larger amounts of cooling water. Installation of such systems would, of course, involve undesirable capital expenditure. Accordingly, the object of the present invention is to take advantage of seasonal variations in cooling water temperatures, by installing an additional ejector that can be seasonally operated in parallel with the primary ejector that has the effect of reducing the process or suction load to the primary ejector and therefore reduces the vacuum column pressure. See FIG. 4.

SUMMARY OF THE INVENTION

The present invention is directed to a plant and method for vacuum distillation of a liquid comprising a vacuum distillation column having a pipeline for receiving a heated feed, a gaseous vapor discharge pipeline and at least one liquid discharge pipeline for discharging at least one liquid fraction; a first condenser; a primary vacuum producing ejector having an inlet and connected to the gaseous vapor discharge pipeline and an outlet end connected to the first condenser; an auxiliary vacuum producing ejector having an inlet end connected to the gaseous vapor discharge pipeline and an outlet end connected to the first condenser; at least one second stage vacuum producing ejector having an inlet end that can be connected to various process components such as the first condenser, a separate second condenser, a condensate collection vessel or a discharge pipeline that routes distillation product to other refining systems. In a preferred embodiment two or more second stage ejectors and condensers are connected in series to form condensate product that is discharged to a condensate collection vessel, usually termed a seal drum. The auxiliary ejector, herein denoted a winter ejector, as a capacity of about 2.0 percent to 20 percent of the capacity of the primary ejector, preferably a capacity of about 5 percent to 15 percent of the primary ejector capacity and more preferably about 10 percent of the primary ejector capacity. More than one auxiliary ejector can be installed to increase operating flexibility; for example, if a 10 percent load reduction is desired two 5 percent auxiliary ejectors may be installed in parallel with a primary ejector. The winter ejector(s) is/are operated in parallel with the primary ejector during the cool season months when the average temperature of available cooling water, for example, in the US Gulf coast region is about 70° F. or about 15 degrees lower than average cooling water temperatures available during the warm season months. In other regions of the World, ambient temperatures and cooling water temperature will vary significantly from this US Gulf Coast region example. The operative factors are the relative difference between cool season and warm season cooling water temperatures and the design limits of the primary ejector. When the winter ejector is operated, the load to the primary ejector will decrease resulting in decreased pressure to the vacuum distillation column. Generally, a decrease in load to the primary ejector will result in an equivalent decrease in vacuum column pressure. For example, if a 10 percent decrease in load to the primary ejector is achieved, the corresponding column pressure will also be reduced 10 percent. Such cool season reduction in vacuum column pressure will increase the recovery of heavy gas oil from heavy petroleum hydrocarbon feeds.

DETAILED DESCRIPTION OF THE INVENTION

Figure 5:
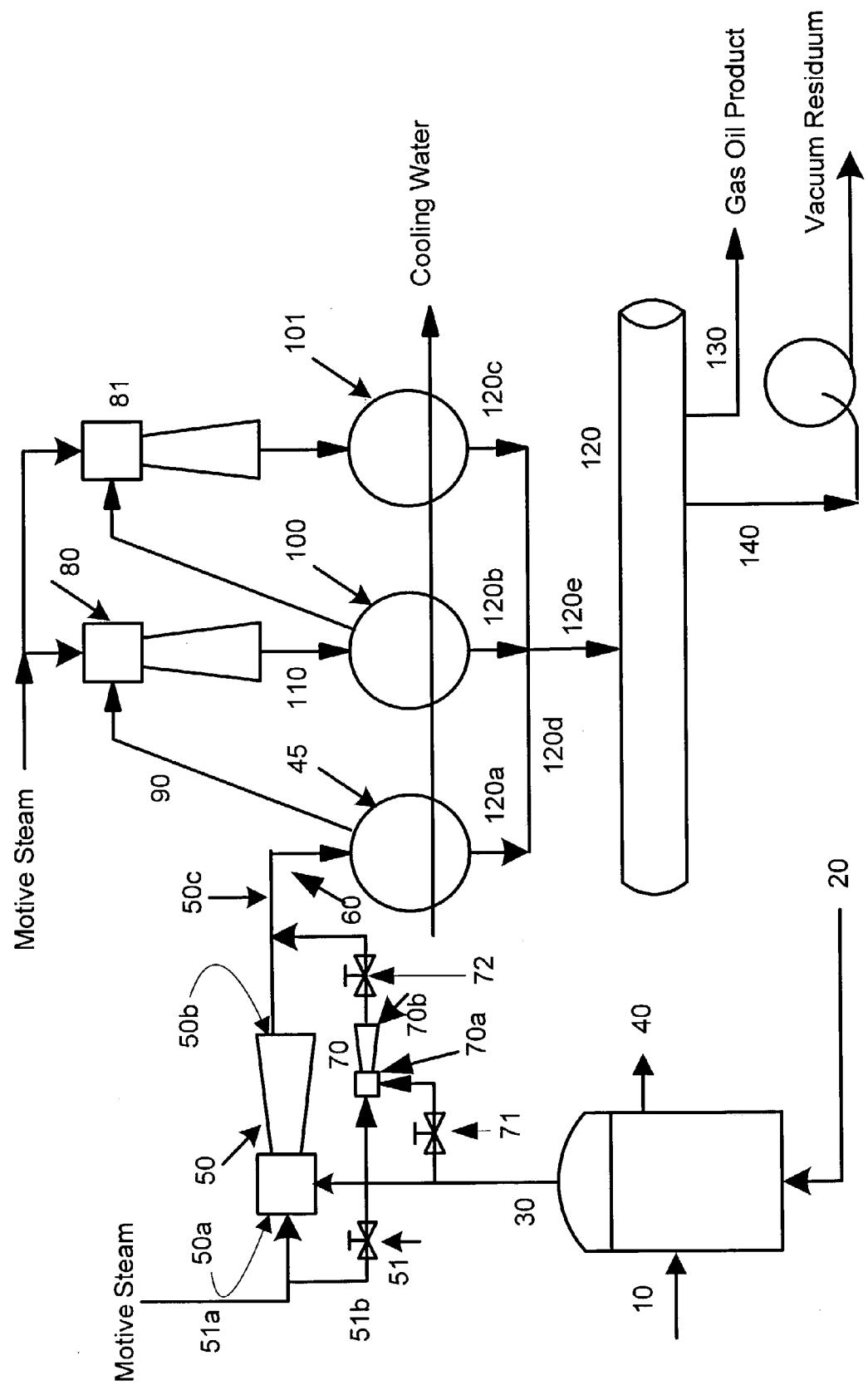
FIG. 5 depicts a preferred embodiment of the vacuum distillation system of the present invention showing the installation of the winter ejector connected in parallel with the primary ejector.

Refer to FIG. 5. A system for vacuum distillation of a hydrocarbon liquid, comprises a vacuum distillation column 10, a pipeline for receiving a heated feed 20, a gaseous vapor discharge pipeline 30, at least one liquid discharge pipeline 40, a first condenser 45, a primary vacuum producing ejector 50 having an inlet end 50A and an outlet end 50B, connected to the first condenser 45 via pipeline 60, and auxiliary vacuum producing ejector 70 having an inlet end 70A connected to the gaseous vapor discharge pipeline 30 and outlet end connected to the first condenser 45, either via pipeline 50C in one embodiment or directly in an alternative embodiment. The system further comprises at least one-second stage vacuum producing ejector 80 having an inlet end connected to the first condenser 45 via pipeline 90 and an outlet end connected to at least one-second condenser 100 via pipeline 110. Preferably, the system includes at least two-second stage vacuum producing ejectors 80, 81 and at least two second stage condensers 100, 101. Condensers 45, 100 and 101 are connected to a condensate collection vessel 120 via pipelines 120A, 120B, 120C, 120D and 120E. The desired gas oil product is recovered from vessel 120 via line 130 and vacuum residuum is recovered from the vessel via line 140.

The primary ejector 50 is designed to receive a process vapor or suction load via gaseous vapor discharge pipeline 30. The auxiliary ejector 70 has a suction load capacity varying between about 2.0 percent to 20 percent of the capacity of the primary ejector, preferably the auxiliary ejector capacity is between about 5 percent to 15 percent of the capacity of the primary ejector and most preferably the auxiliary ejector capacity is about ten percent of the capacity of the primary ejector. The auxiliary ejector 70 is turned on during the cool season months by means of valves 71 and 72 and motive steam is received via valve 51 and lines 51A and 51B. In the warm season, the primary ejector 50 is operated independently of the auxiliary ejector 70 by closing valves 71, 72 and 51 and has a warm season outlet pressure typically about 20% to 40% greater than the cool season outlet pressure. In the cool season, the primary ejector 50 is operated in parallel with the auxiliary ejector 70, which has the effect of reducing the inlet pressure of the primary ejector 50 by about 2 percent to about 20 percent. Preferably, the primary ejector 50 inlet pressure is reduced by about 5 to 15 percent and, most preferably, by about 10 percent when it is operated in parallel with the auxiliary ejector 70 during the cool season months.

Figure 1:
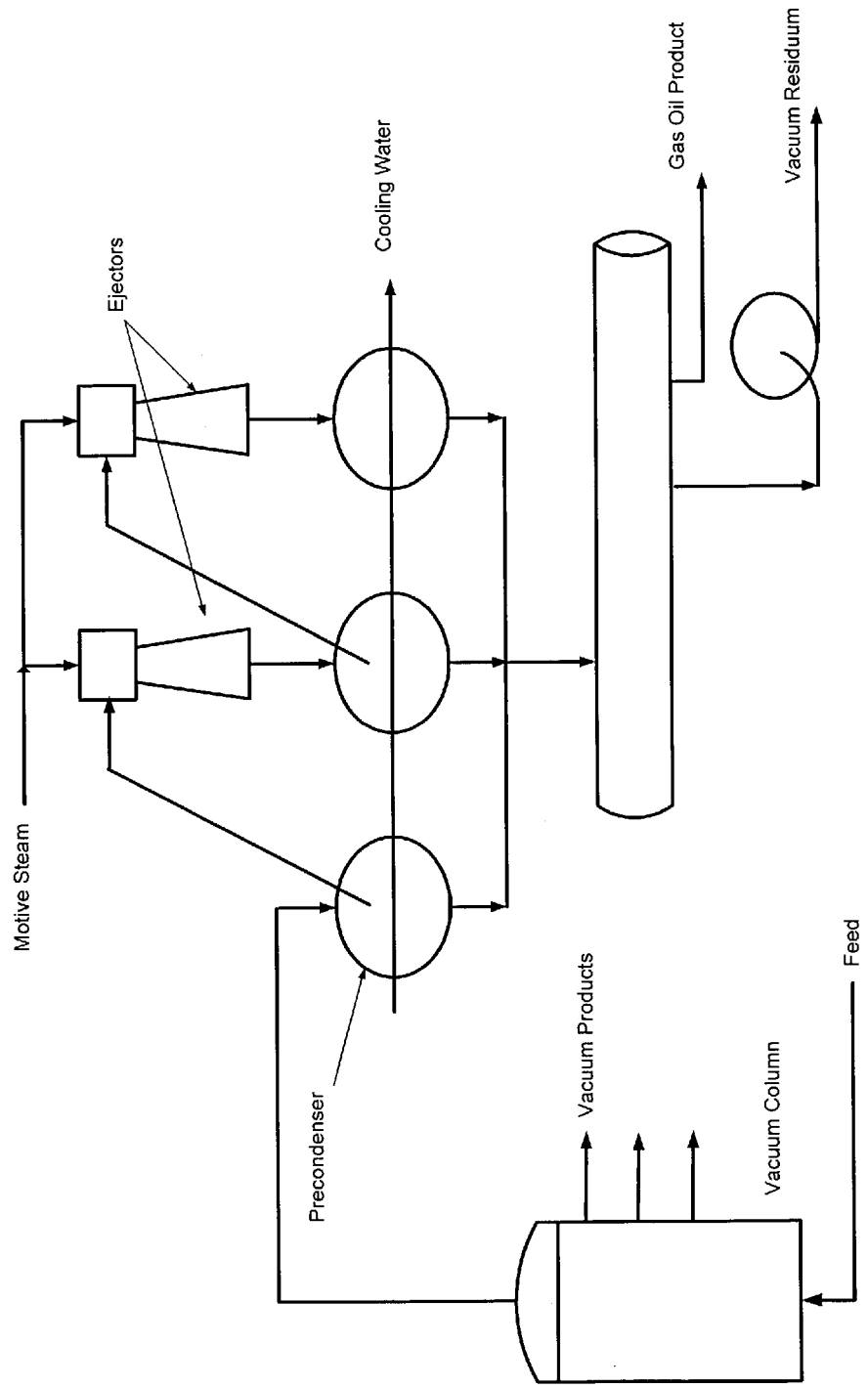
FIG. 1 depicts a conventional pre-condenser type of vacuum distillation system.
Figure 2:
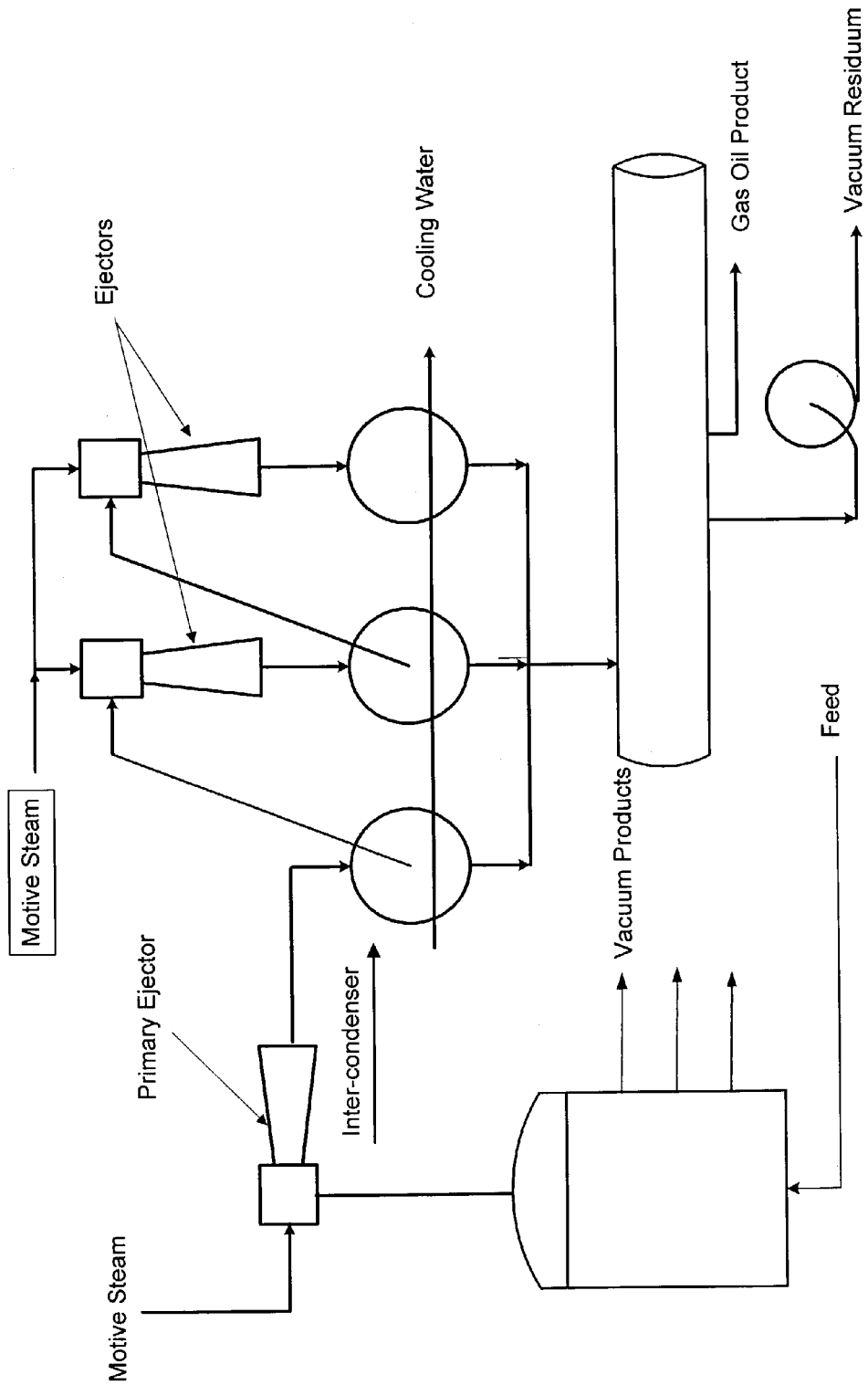
FIG. 2 depicts a conventional "deep-cut" type of vacuum distillation system utilizing a primary ejector upstream of the condensing systems.
Figure 3:
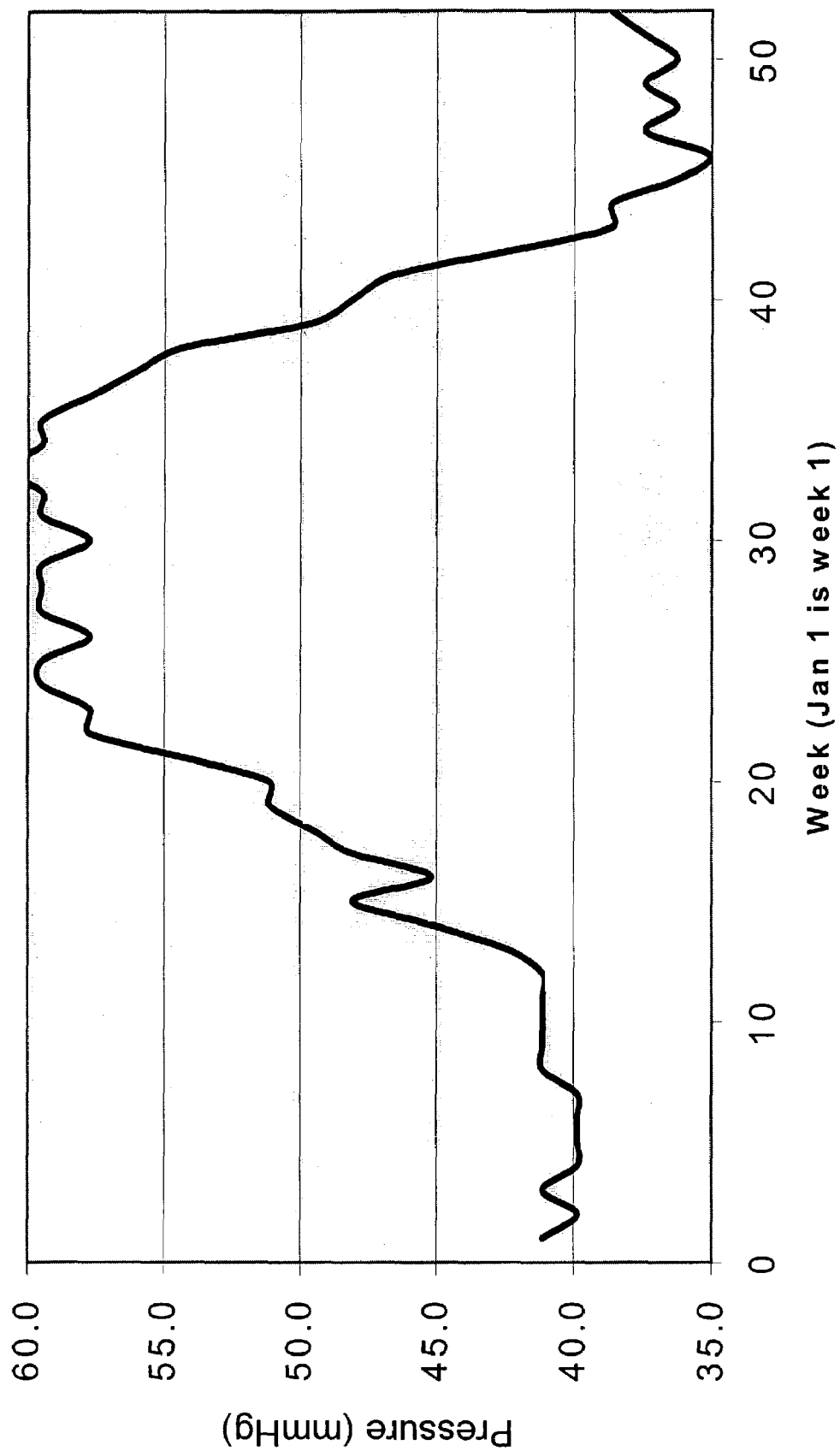
FIG. 3 depicts a typical vapor pressure regime in the inter-condenser in a deep-cut type vacuum distillation system over an annual cycle.
Figure 4:
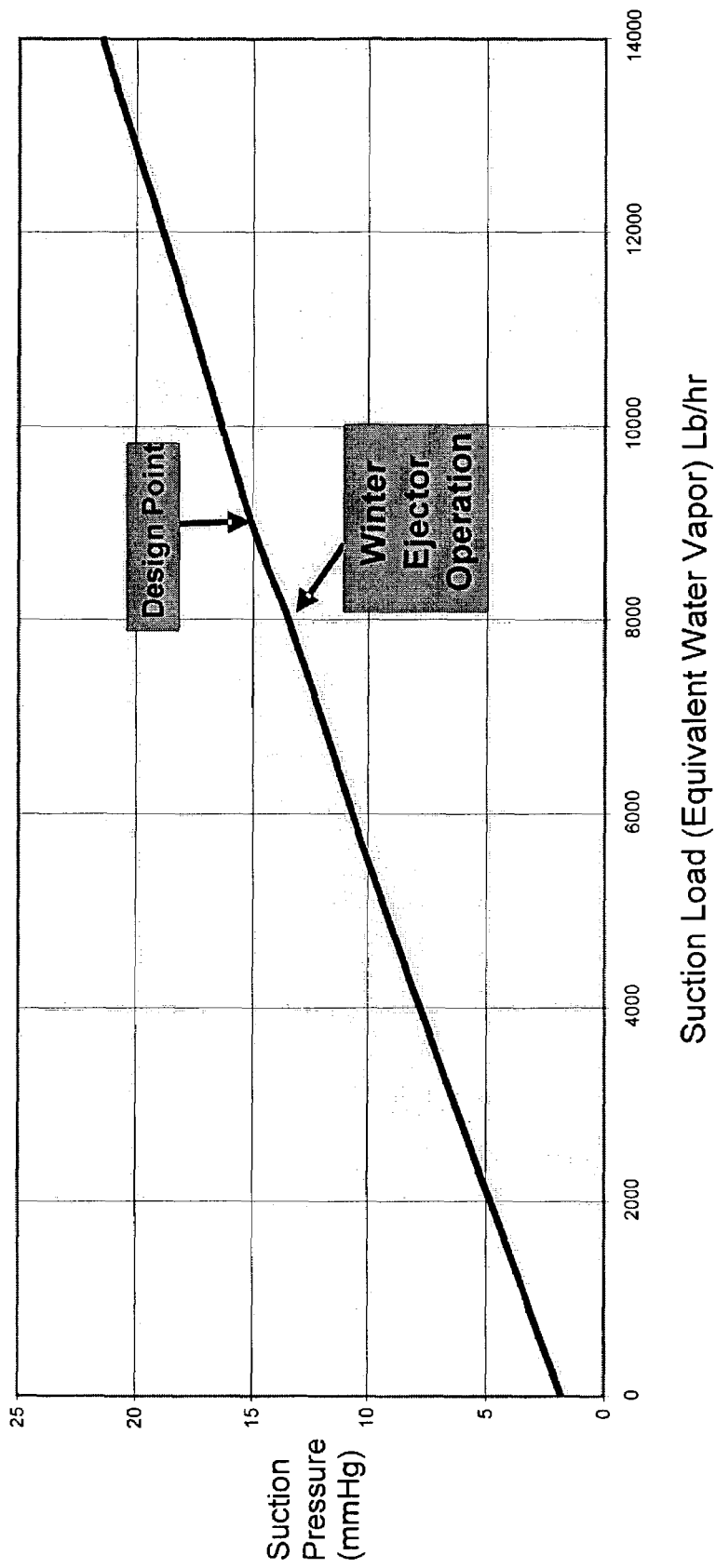
FIG. 4 depicts the characteristic performance curve for a primary ejector in a deep-cut type vacuum distillation system.

A process for vacuum distillation of a hydrocarbon liquid during the cool season utilizing the above described vacuum distillation system comprises the steps of feeding a heated hydrocarbon liquid to the vacuum distillation column 10, maintaining a low absolute pressure in the vacuum distillation column by means of at least one primary ejector 50 and at least one auxiliary ejector 70 operating in parallel with the primary ejector 50, evacuating a first hydrocarbon vapor product from the vacuum distillation column 10, circulating a cooling water stream through a first condenser 45 and at least one second condenser 100; at least partially condensing the first hydrocarbon vapor product in the first condenser 45 to form a first condensate and a second hydrocarbon vapor product; discharging the first condensate to a condensate collection vessel 120 and evacuating the second hydrocarbon vapor product by at least one second stage ejector 80, 81 to at least one second condenser 100, 101, to form a second condensate and discharging the second condensate to a condensate collection vessel 120, and discharging a product from the condensate collection vessel 120 via a product discharge pipeline 130 or 140 for routing distillate products to other refining processes. In the method of this invention, the auxiliary ejector has a suction load capacity between about 2 percent to 20 percent of the suction load capacity of the primary ejector 50, preferably, the suction load capacity of the auxiliary ejector 70 is about 5 to 15 percent of the suction load capacity of the primary ejector 50 and most preferably the suction load capacity of the auxiliary ejector 70 is about 10 percent of the suction load capacity of the primary ejector 50. The method further comprises circulating to the first condenser 45 a cooling water stream having a temperature at least 10° F. below the first condenser 45 design maximum cooling water temperature, which is typically based upon warm season maximum cooling temperatures. Generally, the greater the temperature differential between the design maximum cooling water temperature and the cool season cooling water temperature, the greater the vapor pressure reduction in the first condenser 45, which facilitates operation of the auxiliary ejector and a reduction in suction load to the primary ejector. For example, in the U.S. Gulf Coast Region, the method comprises a cool season cooling water stream having a temperature between 60° F. and 85° F. and a warm season cooling water stream temperature between about 80° F. and 90° F. Thus, in this sub-tropical region, there can be as much as a 30° F. temperature differential between cool season and warm season cooling water temperatures. The auxiliary, winter ejector is operated in parallel with the primary ejector when the cool season water temperature is a least 10° F. below the first condenser 45 maximum design point. In this example, as shown in FIG. 3, during the cool season, vapor pressure in the first condenser 45 varies between about 35 mmHg and 50 mmHg. The method further comprises operating the auxiliary ejector during the cool season months when the first condenser 45 pressure is between about 35 mmHg and 50 mmHg, which has the effect of reducing the suction load of the primary ejector to about 2 percent to 20 percent below its design point. Preferably, the suction pressure of the primary ejector is reduced to between 10 mmHg and 15 mmHg, and most preferably the suction pressure of the primary ejector is reduced to between about 11 mmHg and 13 mmHg.

Thus, it can be seen from the above description that the object of the present invention is to provide and improved system and method for vacuum distillation of a liquid, in particular, heavy hydrocarbon liquids. The system and method involves installation of an auxiliary vacuum producing ejector that can be seasonally operated in parallel with the primary vacuum producing ejector to reduce absolute pressures in the vacuum distillation column by as much as 10 to 15 percent during the cool season months. The system and method takes advantage of the cooler condenser cooling waters that are available during the cool season months.

The invention can be used and the petroleum refining, petrochemical and other industries where vacuum processing of liquid products is required. It is possible to economically integrate the invention process into conventional vacuum distillation systems. It should be noted that various changes and amendments could be made in the details within the scope of the claims set forth below without departing from the spirit of the claimed invention. It should therefore be understood that the claimed invention should not be limited to the specific details shown and described.

What is claimed is:

1. A plant for vacuum distillation of a liquid comprising:
   a. a vacuum distillation column having a pipeline for receiving a heated feed, a gaseous-vapor discharge pipeline and at least one liquid discharge pipeline for discharging at least one liquid fraction;
   b. a first condenser;
   c. a primary vacuum producing ejector having an inlet end connected to the gaseous-vapor discharge pipeline and an outlet end connected to the first condenser;
   d. at least one auxiliary vacuum producing ejector connected in parallel with the primary vacuum producing ejector and connected to a source of motive steam and having an inlet end connected to the gaseous-vapor discharge pipeline and an outlet end connected to the first condenser;
   e. a first valve connected between the vacuum column and the at least one auxiliary ejector;
   f. a second valve connected between the at least one auxiliary ejector and the first condenser;
   g. a third valve connected between the at least one auxiliary ejector and the source of motive steam;
   h. at least one second stage vacuum producing ejector having an inlet end connected to the first condenser and an outlet end connected to at least one second condenser, a condensate collection vessel and a product discharge pipeline.

* * * * *